United States Patent
Tal-Ezer (10) Patent No.: US 6,819,628 B2
(45) Date of Patent: Nov. 16, 2004

(54) WAVE MIGRATION BY A KRYLOV SPACE EXPANSION OF THE SQUARE ROOT EXPONENT OPERATOR, FOR USE IN SEISMIC IMAGING

(75) Inventor: Hillel Tal-Ezer, Natania (IL)

(73) Assignee: Paradigm Geophysical (Luxembourg) S.a.r.l., Luxembourg (LU)

( * ) Notice: Subject to any disclaimer, the term of this patent is extended or adjusted under 35 U.S.C. 154(b) by 25 days.

(21) Appl. No.: 10/408,197

(22) Filed: Apr. 7, 2003

(65) Prior Publication Data
US 2004/0196738 A1 Oct. 7, 2004

(51) Int. Cl.$^7$ .......................... C06G 17/50; G01V 1/30
(52) U.S. Cl. .............................. 367/51; 367/63; 367/73; 175/50; 166/250.01; 702/14; 702/16
(58) Field of Search ............................. 367/51, 63, 73; 175/50; 166/250.01; 702/14, 16

(56) References Cited

U.S. PATENT DOCUMENTS

| | | | | |
|---|---|---|---|---|
| 6,038,389 A | * | 3/2000 | Rahon et al. | 703/10 |
| 6,349,272 B1 | * | 2/2002 | Phillips | 703/2 |
| 2002/0065664 A1 | * | 5/2002 | Witzgall et al. | 704/500 |

FOREIGN PATENT DOCUMENTS

GB        2323949    *    7/1998

OTHER PUBLICATIONS

Tessmer et al "Depth Migration by Polynomial Expansion", 57th EAGE Conf. Jun. 2, 1995, p. 127, vol. 1.*
Hebber E. (Numerical Strategies For The Solution of Inverse Problems, PHD Thesis, Dissertation Abstracts Int. Sect. B, vol. 59 #5, pp. 2084, Nov. 1998.*
Fischer et al, Solving . . . Using a Modified Conjugatr gradient . . . Jour. Scientific Computing, vol. 15, #4, pp 441–456, Dec. 2000.*
Yao et al, Practical Regularization For Seismic Tomography, Geophysics J. Int., vol. 138, #2, PP 293–2—, Aug. 1999.*

* cited by examiner

*Primary Examiner*—Neloson Moskowitz
(74) *Attorney, Agent, or Firm*—G.E. Ehrlich (1995) Ltd.

(57) ABSTRACT

Seismic imaging apparatus for receiving data propagated through sub-surface structure from a seismic source to at least one seismic receiver and forming an image therefrom, the apparatus comprising: an imager for forming an initial image from said data including initial locations of seismic features indicated in said data, a migrator, associated with said imager, for carrying out seismic migration over at least two layers or depth levels to provide corrections to said initial locations, said migrator comprising a krylov space expander for carrying out a krylov space expansion of the exponent of a square root operator, the operator being for defining a wave propagation between respective layers, and a corrector, for using said corrections with said initial locations to form a seismic image indicating said features.

38 Claims, 5 Drawing Sheets

WAVE MIGRATION BY A KRYLOV SPACE EXPANSION OF THE SQUARE ROOT EXPONENT OPERATOR, FOR USE IN SEISMIC IMAGING

FIELD AND BACKGROUND OF THE INVENTION

The present invention relates to seismic migration and particularly its use in imaging and, more particularly, but not exclusively to seismic migration using a Krylov space expansion of the square root operator to approximate a wave equation to allow rapid and accurate modeling of wave propagation between layers.

Geological surveying has widespread applications, for example to locate oil and gas reserves whether on land or offshore. In the past, surveying was carried out by looking at surface geological formations and using the surveyor's knowledge and experience to determine locations of underground or subsurface structures likely to contain reserves. A trial bore was then made at the determined location and tested for the presence of hydrocarbons.

The above process owed much to trial and error, and trial bores are expensive. There is therefore a need to reduce the number of trial bores needed for successful discovery. Thus, more recently methodology has been developed to assist the surveyor by allowing him to learn about the sub-surface structure during the initial survey and prior to making a trial bore. Knowing about the substructure allows for a more educated location of the trial bore and thus improves the efficiency of the surveying process.

One method of finding substructure formations uses satellite imaging. Another method uses seismic imaging. In seismic imaging, a technique similar in principal to radar and sonar is used, in which the time taken by sound waves to travel through the sub-surface structure and return to the surface is measured and used to infer the structure. Seismic data is obtained by sending an energy pulse (basically a sound wave) into the earth and then listening for it to be reflected off rock layers and return to the surface. The time it takes for the pulse to return indicates how far it has traveled. The direction and timing of the received wave indicate where it bounced off a rock layer and allows an image to be constructed indicating the position of those layers.

Seismic imaging can be used in conjunction with software analysis to produce three dimensional images of subsurface rock formations. Seismic imaging thus reduces the trial and error dimension of surveying and provides for greater efficiency.

In more detail, sound waves are produced by a seismic source. The seismic source may for example be a small underground explosion referred to hereinafter as a shot. Dynamite is common on land, and air guns which produce large bubbles are common in water. Another way of producing sound waves is known as Vibroseis, in which a heavy vehicle is shaken in such a way as to produce a set of vibrations. The sound waves subsequently propagate into the earth and partially reflect from interfaces, across which the subsurface velocity or the density varies discontinuously. The reflected waves are recorded by recording devices, known as geophones (or hydrophones in marine surveys), which are usually placed in the vicinity of the surface, or within well bores. The time history of each device, which records the amplitude of the waves detected following a given shot, is stored as a seismic trace. The objective is to deduce the sub-surface structure from the recorded data.

Important in constructing an image from shot data are the relative locations of shot sources and geophones as well as information of the actual energy source used. The relative locations of shot source and geophones dictates the region of the subsurface that is imaged and the resolution level of that image.

Seismic migration or imaging is the process by which the seismic data is mapped to form an image of the subsurface. In general, this mapping requires knowledge of the subsurface velocity. The subsurface velocity is highly variable, depending on the type of material in the subsurface structure. The fact of such velocity variability in the first few kilometers beneath the Earth's surface makes the task of seismic imaging more difficult than other types of acoustical imaging, such as for example ultra-sound and sonar which are carried out through a broadly unified medium. A description of the seismic method and of seismic imaging can be found in standard texts such as M. Dobrin and C. Savit: Introduction to Geophysical Prospecting. McGraw-Hill, New York. 1988, O. Yilmaz. Seismic Data Processing. Society of Exploration Geophysics. 1987, the contents of which are hereby incorporated by reference.

Depth migration refers to a type of imaging which maps the time recorded input seismic traces, that is the time history recorded at each device referred to above, into a subsurface spatial image, taking into account the different velocities at different depths in the structure. Migration is based on solution of a governing wave equation. Most often the acoustic wave equation is used because of its simplicity, and because it produces the correct arrival times of primary (P) waves. However, when more accurate results are required, the elastic equations, or other more elaborate equations may be used. The specific embodiments of the imaging technique disclosed herein use the acoustic wave equation. However the same technique can be applied to imaging based on other types of wave equations, such as the elastic wave equations.

Depth migration methods can be roughly divided into two categories; methods based on direct solution of the wave equation, often termed wave equation migration, and methods based on geometrical optics based approximate solutions to the wave equations. The latter have been termed in the exploration industry as Kirchhoff migration. Kirchhoff migration has been considered faster and more flexible in accepting irregular source-receiver geometry. The downward propagation of the surface data as modeled in wave equation migration is not based on geometrical optics approximations and is thus more realistic although harder to compute. Consequently wave equation migration type approaches are considered to have the potential of producing more accurate results. The embodiments of the present invention described below apply to wave equation migration.

The Basis of Wave Equation Imaging

Considering current art wave equation imaging in greater detail, the surface recorded seismic data can be grouped in different ways, for example, according to shots. In grouping according to shot, all seismic traces produced by a given shot are aggregated together into what is known as a common shot gather. As an alternative, seismic traces may be grouped according to receivers. That is all traces recorded by a surface receiver are aggregated together into a common receiver gather. As a third possibility, grouping according to offsets, all traces for which the shot-receiver separation falls within a specified range are aggregated together into a common offset gather. Each of the above types of data grouping, and other, similar possibilities, has its own imaging method, but the general imaging principles behind all methods are similar. For the sake of clarity and conciseness, the following discussion is limited to acoustic common shot imaging of surface recoded reflection data. The skilled person will appreciate how to apply the principles to the other methods.

Let $p(x,y,z=0, t)$ represent the time history of receivers for a given shot, where $(x, y)$ are the horizontal coordinates of each receiver position. The plane $(z=0)$ defines the surface of the earth, which in the present discussion is assumed to be flat. If needed the scheme can be modified to account for topography. The seismic migration, or imaging, consists of two steps:

1. Extrapolation of the surface data $p(x,y,z=0,t)$ in depth to form $p(x,y,z,t)$.
2. Application of an imaging condition to create the subsurface image $P_{mig}(x,y,z)$.

The subsurface image can be calculated according to $p_{mig}(x,y,z)=p(x,y,z,t=t_d)$, where $t_d$ is the time of arrival of a direct wave from the shot location to the subsurface location, see M. Reshef and D. Kosloff. Migration of common shot gathers. Geophysics 51, 321–331. 1986, the contents of which are hereby incorporated by reference. An alternative imaging condition which is often used is obtained by cross correlating, $P_{mig}(x,y,z)=p(x,y,z,t)*P_{model}(x,y,z,t)|_{t=0}$, where $P_{model}(x,y,z,t)$ denotes the calculated wave amplitude which results from a point source located at the shot position. There are other variants of the imaging condition, all of which use the extrapolated wave amplitude.

The main differences between the imaging techniques available in the seismic industry lie in the method of extrapolating the surface data. The extrapolations are based on solution of the wave equation. For an acoustic medium with constant density, the wave equation reads, $$\frac{1}{c^2}\frac{\partial^2 p}{\partial t^2} = \frac{\partial^2 p}{\partial x^2} + \frac{\partial^2 p}{\partial y^2} + \frac{\partial^2 p}{\partial z^2}. \quad (2.1)$$

$t$ denotes time, and $c(x,y,z)$ is the seismic velocity. An assumption of constant density is often used since it produces the same arrival times as the variable density equation and it is simpler to solve. An alternative expression is obtained after a temporal Fourier transform of this equation, $$\frac{\partial^2 \tilde{p}}{\partial z^2} = -\frac{\omega^2}{c^2}\tilde{p} - \frac{\partial^2 \tilde{p}}{\partial x^2} - \frac{\partial^2 \tilde{p}}{\partial y^2}. \quad (2.2)$$

$\tilde{p}(x,y,z,\omega)$ denotes the Fourier transform of $p(x,y,z,t)$, and $\omega$ denotes the temporal frequency. Equation (2.1) is most suitable for extrapolation in time. The resulting type of migration is called reverse time migration, see G. McMechan. Migration by Extrapolation of Time Dependent Boundary Values. Geophysical Prospecting, 31, 413–420. 1983; and E. Baysal, D. Kosloff, and J. Sherwood. Reverse Time Migration. Geophysics, 48, 1414–1524, 1983. The contents of both of these citations are hereby incorporated by reference. With the reverse time migration approach, the surface recorded data is introduced as a surface boundary condition for solving (2.1), where the values are introduced in a reverse order in time. The reverse time type of migration has the potential for high accuracy, however it is considered to be slow. A more efficient type of migration is obtained by a downward extrapolation in depth based on (2.2). Accordingly, each frequency slice $\tilde{p}(x,y,z=0,\omega)$ is used as an initial condition for calculating $\tilde{p}(x,y,z,\omega)$ at all depth levels. These methods are often termed fxy migration methods, where $f$ stands for frequency. The problem with downward extrapolation is that in the case of variable velocity, in fact the usual case, it is not possible to solve (2.2) by a direct integration in z. This can be understood by examining the solution of (2.2) in the wave number domain when the velocity c is constant, $$\tilde{\tilde{p}}(k_x, k_y, z, \omega) = A_+ e^{ik_z} + A_- e^{-ik_z}, \quad (2.3)$$

where $\tilde{\tilde{p}}(k_x, k_y, z, \omega)$ is the two dimensional spatial Fourier transform of $\tilde{p}(x,y,z,\omega)$, and $$k_z = \sqrt{\frac{\omega^2}{c^2} - k_x^2 - k_y^2} \cdot k_x, k_y$$

are respectively the x and y wave numbers. When $$k_x^2 + k_y^2 < \frac{\omega^2}{c^2}, k_z$$

is real, the solution represents propagating waves. In this case $A_+$ and $A_-$ represent the amplitudes of down-going and up-going waves respectively. Conversely when $$k_x^2 + k_y^2 > \frac{\omega^2}{c^2}, k_z$$

is imaginary and the solution represents exponentially decaying or increasing solutions, depending on the sign in the exponential. The exponentially increasing solution components cause numerical instability and therefore need to be eliminated. While this elimination can be easily done in (2.3), in the case of general velocity variation $c(x,y,z)$, these components cannot be isolated in a simple manner. Existing methods for fxy migration attack this difficulty in a number of ways.

One approach for downward continuation uses one-way wave equations instead of the acoustic wave equation, and reference is made to J. Claerbout and S. Doherty. Downward continuation of move-out corrected seismograms: Geophysics 37, 112–139. 1972 the contents of which are hereby incorporated by reference. The solution to these equations contains only up (or down) going propagating waves without exponentially growing components. In regard to the propagating wave components, the equations have solutions which are close in value to the solutions to the exact wave equation in cases up to a certain dip angle. The limiting dip angle depends on the complexity of the particular one-way wave equation being used, where as a rule, a better and steeper dip response requires a more complex equation and a larger numerical effort to solve it. The main drawbacks of this approach are numerical dispersion and a dip angle limitation. Consequently, migration approaches based on one-way wave equations may fail to image structures containing steep dips.

A second class of downward propagation methods is based on a design of explicit operators for a suite of constant velocities, and reference is made to D. Hale. Stable explicit depth migration of seismic wavefields. Geophysics 56 1770–1777, 1991; and R. Soubaras. Explicit 3-D migration using equiripple polynomial expansion and Laplacian synthesis. Geophysics 61, 1386–1393. 1996, the contents of both of these documents being hereby incorporated by reference. The downward continuation from one depth level to the next becomes an application of a spatially variant filter, where the filter coefficients at each image point are selected according to the value of the velocity thereat. The explicit operators approach also suffers from dip limitations since the filter coefficients are designed to match the solution (2.3) up to a specified dip value. It is noted that for a given frequency ω and constant velocity c, the dip angle θ is related to the horizontal wave number $k_x$ by $\sin θ = ck_x/ω$. A better dip response requires a longer, and hence more expensive, filter. In addition, the explicit operator method becomes more expensive and complicated in 3D compared to 2D. A third approach for affecting downward continuation with variable velocity is based on perturbation of the solution (2.3) for constant velocity. The solution (2.3) is modified according to the difference between a constant background velocity used, and the actual velocity in the subsurface. The simplest version is the split step or phase shift plus correction (PSPC) method discussed in P. Stoffa, J. Fokkema, R. Freire, and W. Kessinger. Split-step Fourier migration. Geophysics 55, 410–421, 1990, the contents of which are hereby incorporated by reference. In the PSPC method the propagation from one depth level z to the next level z+dz is obtained by applying the first term the solution (2.3) (only up going waves) with a constant background velocity $c_0$ to $$\tilde{\tilde{p}}(k_x, k_y, z, ω).$$

This is followed by application of a spatial Fourier transform to the x,y domain, and a multiplication of the result by the factor $\exp(iωdz(1/c(x,y,z)-1/c_0))$. The accuracy of this approach depends upon the magnitude of the difference between the values of the background velocity and the actual subsurface velocity. More accurate methods use a higher order perturbation to the constant velocity solution. These methods have been termed screen and pseudo screen propagators, and are discussed in M. De Hoop, J. Rousseau, and R. S. Wu. Generalization of the phase screen approximation for scattering of acoustic waves. Wave Motion, 31, 43–70, 2000, the contents of which are hereby incorporated by reference. The main drawback of these methods is that they are based on an approximate solution to the wave equation that becomes inaccurate in the presence of strong velocity contrasts. A partial remedy to the above-described problem is to use multiple background velocities instead of one, and at each subsurface location to select the solution corresponding to the background velocity closest in value to the actual velocity at that location.

The above solution is only partial, and methods based on the direct wave equation approach remain highly complex to calculate, although they give the most accurate results.

There is thus a widely recognized need for, and it would be highly advantageous to have, a seismic imaging method based on wave propagation but devoid of the above limitations.

SUMMARY OF THE INVENTION

In accordance with a first aspect of the present invention, a seismic imaging method of the wave equation migration type is provided by solving equation (2.2) above using an approach based on a rational Krylov expansion.

According to one aspect of the present invention there is provided a method of imaging using wave propagation data, comprising carrying out wave migration to model wave propagation layerwise, the migration comprising:
using a krylov space expansion of an exponent of a square root operator to approximate a predetermined wave equation, and
using the approximation to model propagation of a wave between a first depth level and a second depth level, and
using the migration, together with the received data to map positions of features through which the wave propagation has occurred.

The method preferably comprises obtaining the krylov space expansion using at least one shift parameter for providing solutions of the predetermined equations in depth.

Preferably, the seismic migration is carried out on a plurality of signal traces and further comprising carrying out stacking between the traces.

In an embodiment, the stacking is carried out after the migration, in which case the data comprises M data and P data and the migration is carried out on a slice of the M data and a slice of the P data to provide M and P propagated data slices.

The method preferably comprises combining the M and P propagated data slices.

In an alternative embodiment, stacking is carried out before migration. In this case the data comprises P data and migration is carried out on a slice of the P data.

The method may utilize any one of a group of data gathering methods comprising but not exclusive to common shot data gathering, common receiver data gathering, common offset data gathering, simultaneous shot geophone data gathering, zero offset imaging, and vertical seismic profiling.

Preferably, the predetermined wave equation is the acoustic wave equation.

Preferably, the imaging is seismic imaging and the features are features of sub-surface geological structure.

Additionally or alternatively, the predetermined wave equation is the elastic vector wave equation.

Additionally or alternatively, the predetermined wave equation is a visco-elastic wave equation.

Additionally or alternatively, the approximating is carried out in time for at least one of forward migration and reverse time migration.

In one preferred embodiment, the wave propagation comprises carrying out forward simulation of wave propagation in the geological structure, and the migration comprises reverse time migration.

According to a second aspect of the present invention there is provided a method of seismic imaging comprising:
obtaining wave propagation data from a seismic source at a seismic receiver,
determining from the wave propagation data false locations of seismic features indicated in the data,
carrying out seismic migration over at least two depth levels to provide corrections to the false locations, wherein the seismic migration comprises using a krylov space expansion of an exponent of a square root operator to approximate a wave equation and therefrom to model wave propagation between the at least two depth levels,
using the corrections with the false locations to form a seismic image indicating the features.

Preferably, the wave equation is any one of a group comprising the acoustic wave equation, the elastic vector wave equation and the visco-elastic equations.

The method preferably comprises obtaining the Krylov space expansion over a depth using at least one shift parameter.

Preferably, the seismic migration is carried out on a plurality of signal traces and further comprises carrying out stacking between the traces.

In one embodiment, the stacking is carried out after the migration, in which case the data comprises M data and P data and migration is carried out on a slice of the M data and a slice of the P data to provide M and P propagated data slices.

The method preferably comprises combining the M and P propagated data slices.

Additionally or alternatively, stacking is carried out before migration. In such a case, the data comprises P data and migration is carried out on a slice of the P data.

The method non-exclusively includes utilizing any one of a group of data gathering methods comprising common shot data gathering, common receiver data gathering, common offset data gathering, simultaneous shot geophone data gathering, zero offset imaging, and vertical seismic profiling.

Preferably, the seismic migration comprises wave equation migration.

According to a third aspect of the present invention there is provided seismic imaging apparatus for receiving data propagated through sub-surface structure from a seismic source to at least one seismic receiver and forming an image therefrom, the apparatus comprising:

an initial wave analyzer for forming an initial analysis from the data including determining initial locations of seismic features indicated in the data, a migrator, associated with the imager, for carrying out seismic migration over at least two depth levels to provide corrections to the initial locations, the migrator comprising a Krylov space expander for carrying out a Krylov space expansion of an exponent of a square root operator to approximate a predetermined wave equation, and therefrom to model a wave propagation between respective depth levels of the sub-surface structure, and a corrector, for using the corrections with the initial locations to form a corrected mapping indicating the features, the mapping being usable for forming the seismic image.

Preferably, the predetermined wave equation is any one of a group comprising the acoustic wave equation, the elastic vector wave equation and the visco-elastic wave equations.

Preferably, the Krylov space expander is configured to obtain the Krylov space expansion over a depth using at least one shift parameter.

Preferably, the migrator is configured to carry out the seismic migration on a plurality of signal traces and the apparatus further comprises a stacker for carrying out stacking between the traces.

In an embodiment, the stacker is located after the migrator, in which case the data comprises P data and the migrator is configured to carry out the migration on a slice of the P data.

In an alternative embodiment, the stacker is located before the migrator, in which case the data comprises M data and P data and the migrator is configured to carry out the migration on a slice of the M data, and a slice of the P data to provide M and P propagated data slices.

Preferably the migrator further comprises a combiner for combining the M and P propagated data slices.

The apparatus is preferably configured to utilize at least one of a group of data gathering methods comprising common shot data gathering, common receiver data gathering, common offset data gathering, simultaneous shot geophone data gathering, zero offset imaging, and vertical seismic profiling.

Preferably, the mapping is three-dimensional mapping suitable for preparation of a three-dimensional image.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present embodiments show a seismic imaging method and apparatus, of the wave equation migration type, which carries out the stage of seismic migration between successive image layers by solving equation (2.2) above using an approximation based on a rational Krylov expansion. The approximation is used to calculate wave propagation from one layer to the next.

Figure 1:
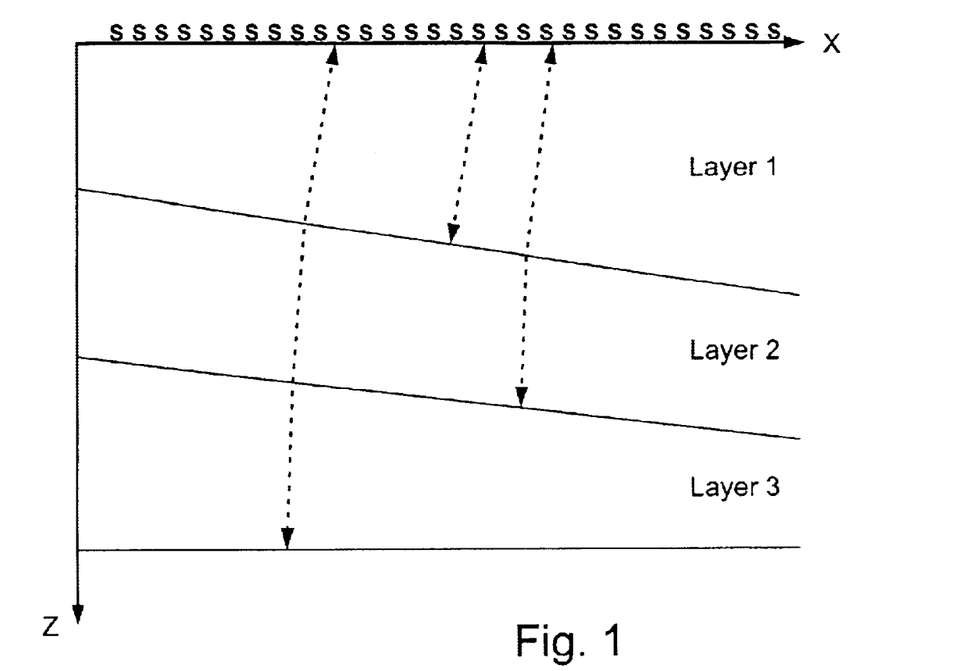
FIG. 1 is a simplified diagram showing a zero offset seismic survey over a geological structure containing three layers which are separated from each other by planar interfaces.

In order to help understand the invention, reference is now made to FIG. 1, which is a simplified diagram illustrating a zero offset seismic survey. In a zero offset survey, a series of shots (S) are fired on the surface at equal horizontal increments. The waves emanating from each shot hit various layer boundaries and other structural features in the subsurface and at least part of the incident wave is then reflected and at least partly transmitted. The reflected energy from each shot is recorded by a single detector which is placed on the surface at the same location as the shot. The reflected waves from the horizons follow ray paths which obey Snell's law upon crossing layer boundaries. For a zero offset survey where the shot and receiver are at the same location, the downward ray path from the shot to the reflecting horizon, is identical to the upward ray path from the reflecting horizon to the receiver. The figure illustrates three such ray paths from the three reflecting horizons.

Figure 2:
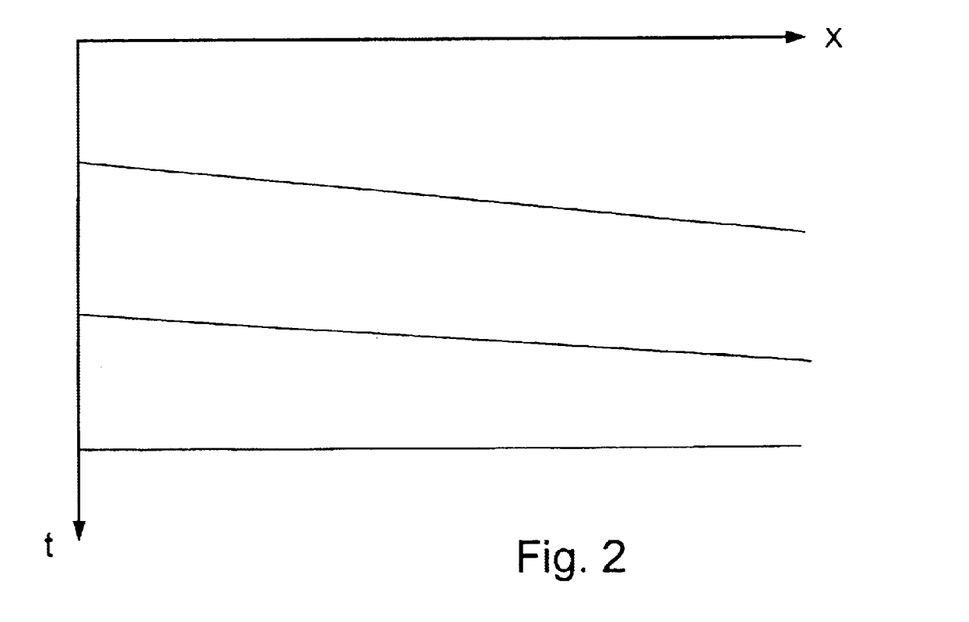
FIG. 2 presents the events which appear on the zero offset time section which would be obtained with the structure of FIG. 1.

The time histories of the recording devices are grouped together to form a seismic section, where the horizontal coordinate denotes the detector position and the vertical coordinate denotes time, as shown in FIG. 2. An examination of FIG. 1 reveals that for constant subsurface velocity, planar dipping layers also appear as planar dipping events on the time section. Reflecting surfaces with moderate curvature appear on the time section as events which closely resemble the true reflecting horizons. For this reason, when the structures are mild and have a small velocity variation, the geological interpretation is often done directly on CMP stacked sections, which are quite similar to zero offset sections.

When the subsurface velocity is highly variable, or when the reflecting surfaces have strong curvature or lateral variation, the zero offset time section will be quite different from the actual subsurface structure. In such cases an additional step is required where the time section is mapped to form an image of the subsurface. Such mapping is termed seismic migration by the exploration industry.

Correct imaging requires knowledge of the subsurface velocity. However, the velocity itself is one of the parameters that need to be determined in the data processing. Currently, velocity determination and migration are usually performed iteratively. At first, a crude velocity estimate is used for the imaging. Subsequently, the resulting seismic image is used to improve the velocity estimate. The process is repeated until a satisfactory result is obtained.

Currently most seismic surveys utilize a number of detectors for each shot at different locations, as opposed to the single detector of the zero offset configuration described here. However, in conventional seismic processing, seismic traces from a number of detectors are summed together to form a CMP stacked section. This section closely resembles a zero offset section.

Seismic imaging can be carried out on the data before the stacking. Such migration is termed pre-stack migration. In complicated structures, the CMP stacking may cause degradation in the final image quality. With such structures, pre-stack migration is the preferred alternative.

The skilled person will appreciate that a wave pattern is emitted in all directions. A series of detectors at different angles and different distances allow a three-dimensional image to be constructed.

Figure 3:
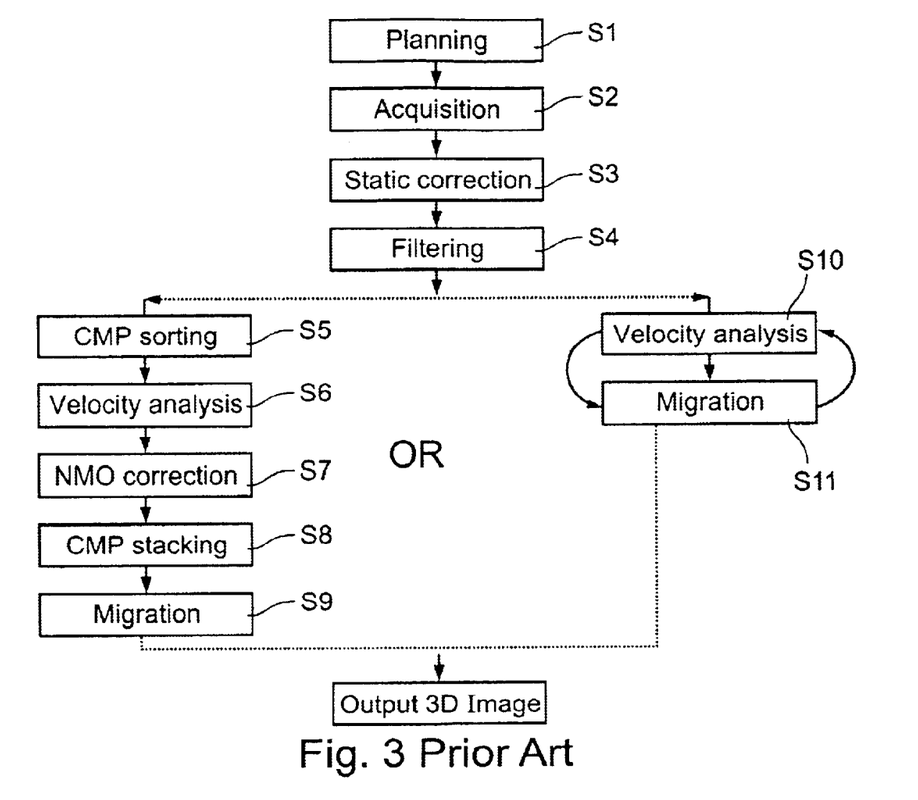
FIG. 3 is a simplified flow chart showing a conventional process for seismic migration.

Reference is now made to FIG. 3, which is a simplified flow diagram illustrating the stages in conventional procedures for acquiring two or three dimensional seismic images. In a first stage S1, of planning, suitable locations are determined for one or more shot sources and a plurality of detectors. In a stage S2 of acquisition, shots are carried out and corresponding data is obtained at the detectors.

In a stage S3, static corrections are applied to the data to account for surface topography and near surface lithology. The static corrections convert the recorded data to the type of data that would be recorded with the same deep structure but with a simpler near surface. The static corrections remove the arrival time anomalies caused by the surface weathered zone (which is often very irregular). Depending on the processing objectives, static corrections also remove part or all the effects of the surface topography. It is noted that usually, static corrections are not necessary with marine surveys.

In a stage S4, filters of various sorts are applied to remove incoherent and coherent noise (e.g. surface multiples), to compensate for degradation of the signal as it passes through the earth (deconvolution).

After stage S4 there are two major processing alternatives, CMP stacking and post-stack migration, or direct pre-stack imaging. The first alternative requires less computing resources and was the conventional approach in the past.

In step S5 (first alternative), the data is re-sorted from shot gather order to common midpoint order (CMP), where each gather consists of traces from shot-receiver pairs which share a common midpoint on the surface. In a stage S6, a process known as NMO velocity analysis is performed to find a stacking velocity time function which yields the best hyperbolic fit to the arrival times of the seismic reflection events on the CMP gathers. In stage S7 the traces are shifted in time according to the stacking to velocity and offset. The latter process approximately equalizes all arrival times on the traces to the zero offset arrival which would result from the experiment where both the shot and the receiver are located at the common midpoint (CMP) of the gather. Optionally at this stage a DMO (dip moveout) correction is applied to the CMP gathers to account for the dependence of stacking velocities on reflector dip.

In a stage S8, a process known as stacking takes all the traces in the gather and sums them into a single output trace. The signal part of the trace is strengthened by adding as it is approximately the same on each trace. The noise however is generally random between the traces so that when the traces are added the noise cancels itself out. Stacking is a significant factor in improving quality. It also has the effect of greatly reducing the number of traces being examined (by a factor of 10 or more). For this reason, other parts of the imaging process, particularly migration (see below) are usually categorized as being pre- or post-stack. Pre-stack process are more costly as they have to deal with more data.

A stage S9 of migration is carried out. Some structures produce a false image in seismic data. Migration, as mentioned above, uses information about the varying speed of sound within the earth to calculate corrections so as to move these false images back to where they belong. Migration has, in the past, most usually been performed on stacked data but, as computer power grows, pre-stack migration is becoming more common, and as is shown in the figure, both alternative procedures are described. Embodiments are described below for both pre and post stacking migration according to the present invention.

In the second processing alternative, in stage S10, velocity analysis is carried out for determining the subsurface interval velocity. The subsurface interval velocity is different from the stacking velocity of the first processing alternative, and resembles the actual physical velocity in the subsurface with some smoothing. In stage S11 pre-stack migration is carried out. Depending on the migration results, the subsurface velocity is updated, and a new pre-stack migration is performed. This cycle is repeated until sufficient accuracy is obtained.

In the embodiments of the invention presented here, the process of migration is carried out using a Krylov expansion to provide a numerical solution of the wave equation. For purposes of better understanding of the present invention, reference is now made to the theory and practical operation of Krylov expansion.

The Krylov method is a general approach for approximating a vector that results from operating on another vector with a matrix function, thus $$v=f(A)w.$$

Given w, an orthogonal vector space of dimension m is created from

K=span(w, Aw, $A^2$w, ... $A^{m-1}$w). The vector v is calculated by an expansion with the basis vectors that span K.

When $f(x)=x^{-1}$, the problem becomes one of solving a system of linear equations. The GMRES linear equation solver, as discussed in Y. Saad and M. Schultz (1986): "GMRES: A Generalized Minimal Residual Algorithm for Solving Nonsymmetrical Linear Systems," SIAM J. Scientific and Stat. Comp. 7, 856–859G, and also Goulub and C. Van Loan: Matrix computations. Johns Hopkins University Press 1996, is based on such a Krylov expansion. The GMRES method has become very important in solving large systems of linear equations with non symmetric matrices.

A second application of the Krylov method is the numerical solution of partial differential equations (PDE). Many linear systems of time dependant PDE can be represented, after a spatial discretization, as a set of ordinary differential equations (ODE), $$u_t=Gu+s,$$

with initial conditions, $$u(t=0)=u^0,$$

where G is a matrix and s is a source vector.

A formal solution to this equation is given by, $$u(t+\Delta t)=u(t)+f(G)(Gu(t)+s) \quad (3.1)$$

where, $$f(z) = \frac{e^{z\Delta t} - 1}{z}.$$

Upon defining v=Gu(t)+s and $f(G)=G^{-1}(e^{G\Delta t}-1)$, we can use the Krylov algorithm to compute an approximation to the r.h.s. of (3.1). High efficiency may be achieved for numerical solutions of PDE's. Results are described in H. Tal-Ezer, R. Kosloff and C. Cerjan: Low Order Polynomial Approximation of Propogator to the Time-Dependent Schrodinger Equation. Journal of Comp. Phys. Vol. 100, No 1, pp. 179–187 (1992); E. Gallopoulos and Y. Saad: Efficient Solution of Parabolic Equations by Krylov Approximation Methods. SIAM J. Sci. Stat. Comput., 13(5):1236–1264, September 1992; E. Gallopoulos and Y. Saad, On the Parallel Solution of Parabolic Equations. Proc. 3d ACM Int'l. Conf. Supercomputing, 17–28, also CSRD Tech. Rept. 854. M. Hochbruck, C. Lubich, H. Selhofer: Exponential Integrators for Large Systems of Differential Equations. Siam J. Sci. Comp., 19(5), 1552–1574, (1998); and M. Hochbruck and C. Lubich, Exponential Integrators for Quantum-Classical Molecular Dynamics. The contents of each of the above documents are hereby incorporated by reference.

Ruhe originally developed the rational Krylov algorithm for eigenvalues problems. The algorithm is discussed in A. Ruhe: Rational Krylov Sequence Methods for Eigenvalues Computation. Lin. Alg. Appl., 58: 391–405, 1984; A Ruhe: Rational Krylov Algorithms for Nonsymmetric Eigenvalue Problems, II: Matrix Pairs. Lin. Alg. Appl, 197/198:283–296, 1994, Computation; and A. Rube: The Rational Krylov Algorithms for Nonsymmetric Eigenvalue Problems, III: Complex Shifts for Real Matrices. BIT, 34:165–176, 1994. The contents of each of these documents are hereby incorporated by reference.

The rational Krylov algorithm may be viewed as enlarging the approximating space such that $$K=\text{span}(w, Aw, A^2w, \ldots A^{m-1}w, (A-\beta_0 I)^{-1}w,$$

$$(A-\beta_1 I)^{-1}w \ldots (A-\beta_{m-1}I)^{-1}w) \quad (3.2)$$

Later, rational Krylov was implemented in the Model Reduction approach for solving control problems and reference is made in this respect to D. Skoogh: A Rational Krylov Method for Model Order Reduction. Technical Report 1998–47, Department of Mathematics, Chalmers University of Technology and the University of Goteborg, Goteborg, 41296, Sweden, 1998; A. Ruhe and D. Skoogh, Rational Krylov Algorithms for Eigenvalue computations and Model Reduction, In B. Kagstrom et al(eds), Applied Parallel Computing PARA '98, Lecture Notes in Computer Sciece, No. 1541, 491–502. 1998; E. J. Grimme: Krylov Projection Methods for Model Reduction. Phd thesis, University of Illinois at Urbana-Champaign, 1997; E. J. Grimme, D. C. Sorensen and P. Van Dooren: Model Reduction of State Space Systems via an Implicitly Restarted Lanczos Method. Numerical Algorithms, 12:1–32, 1996; and K. Gallivan, E. Grimme, D. Sorensen, A Rational Lanczos Algorithm for Model Reduction. Numerical Algorithms, Vol 12, pp. 33–63, 1995. The contents of these documents are hereby incorporated herein by reference. The approximation used in the above-described control context is more effective than the ordinary Krylov method when $f(z)$ has singularities, as in fact are present in the wave migration case. The evaluation of the rational approximation space requires solution of linear equations for calculating the negative power vectors. The viability of the method depends on how efficiently such calculation can be done.

In order to reduce the negative power vectors part of the computation, equation (3.2) was modified to use only one shift parameter $\beta$ as is discussed in greater detail below. It can be considered as a special case of a rational approximation where the m polynomial in the denominator has only one root of multiplicity m. The approximation space then becomes, $$K=\text{span}(w, Aw, A^2w, \ldots A^{m-1}w, (A-\beta I)^{-1}w,$$

$$(A-\beta I)^{-2}w \ldots (A-\beta I)^{-m}w) \quad (3.3)$$

V. Drushkin, and L. Knizhnerman, in Extended Krylov subspaces:

Approximation of the matrix square root and related functions. Siam J. Matrix Anal. Appl. 19, 755–771, 1998, describe having used the rational Krylov method without shifts, that is to say with all $\beta_j$ in (3.2) set to zero, for an example of an elliptic equation arising from geophysical electric tomography. The function of the operator in this example was of the form $f(x)=\exp(-\alpha\sqrt{x})$ for $\alpha>0$, and $x>0$, which resembles the operator function in our solution scheme. However in their example, unlike with the wave equation (2.2), the operator used was a symmetric positive definite operator and hence the singularity of the exponent of the square root operatoris not in the eigenvalue domain. This fact makes the approximation problem much easier. Moreover, the inverse operator can be computed efficiently. Thus they did not have to handle operator singularity, or negative eigenvalues that can cause exponential growth of the solutions.

The above is a general introduction to the Krylov expansion as used herein. A derivation of the Krylov expansion as used herein follows as well as a description of the way in which the expansion is used to approximate a wave equation.

Before explaining the embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 4:
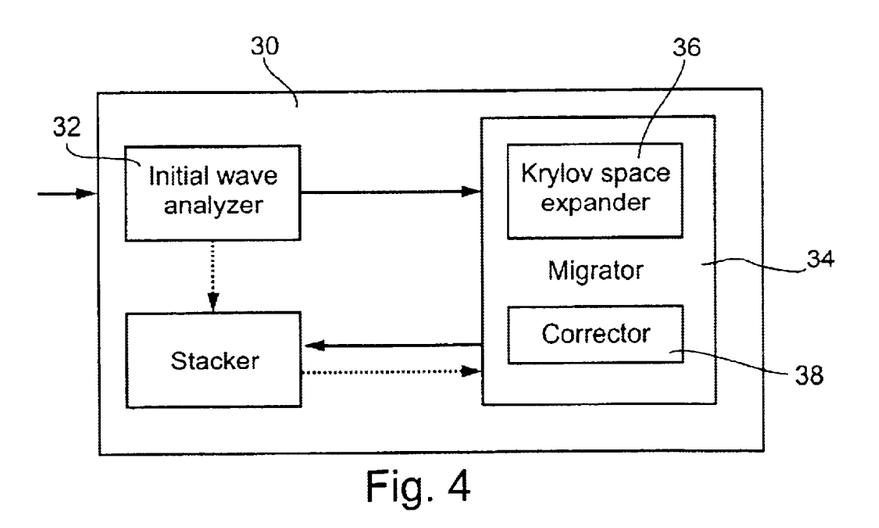
FIG. 4 is a simplified diagram illustrating apparatus for carrying out seismic imaging according to a first preferred embodiment of the present invention.

Reference is now made to FIG. 4, which is a simplified diagram showing seismic imaging apparatus of a first preferred embodiment operative in accordance with the present invention. Seismic imaging apparatus 30 receives data from a number of seismic receivers or geophones 12. The data is received by the geophones following propagation of vibrations through sub-surface structure from a seismic source 10. The purpose of the apparatus is to form a mapping, preferably in the form of a two- or three-dimensional image, of the surface substructure through which the vibrations have been propagated. An initial mapping is preferably formed of structural features from the received data using an initial wave analyzer 32. The initial analyzer uses the stages in FIG. 3 with simplified migration algorithms such as for example Kirchhoff migration. In this process, the subsurface interval velocities are determined and an initial subsurface image is formed. Because of the inherent limitations of the migration algorithms used, the resulting subsurface image is incomplete and may lack detail and clarity.

A migrator 34, is associated with the initial wave analyzer 32, for carrying out seismic migration. Seismic migration is a calculation of wave propagation from one layer to another which takes into account varying velocities within the propagation medium, as discussed above. Within the migrator, the space under study is divided into horizontal layers so that wave propagation from one layer to the next can be calculated to correct for the varying velocities at the different depths. Preferably, wave propagation is calculated as described above using solutions of the wave equation. Typically the wave equation used is the acoustic wave equation but other wave equations may be used as discussed above. The migrator 34 comprises a Krylov space expander 36 for carrying out a Krylov space expansion of the exponent of a square root operator, and the expansion is used to approximate the wave equation numerically to define the wave propagation between the respective layers.

In a preferred embodiment, a corrector 38, which may be part of the migrator or may simply be connected thereto, applies velocity updating corrections determined from the migration, to the initial mapping. Alternatively, such updating may have been carried out in the initial analyzer.

In general, a number of signal traces of the wave propagation are obtained. A stacker 40 is preferably used to carry out addition between different traces, as described above in respect of FIG. 4 to strengthen the signal and cancel out noise.

Stacking can be carried out either before or after migrating, as indicated by the solid and dotted line arrows in FIG. 3. Common shot migration uses the imaging principle of cross-correlation of downward continued seismic data and forward modeled data from the source location. Thus, both the seismic data, the P data, and the modeled wave field, the M data, need to be separately downward continued. On the other hand, in post stack migration only the seismic or P data $p(x,y,z,\omega)$ is downward continued.

Figure 5:
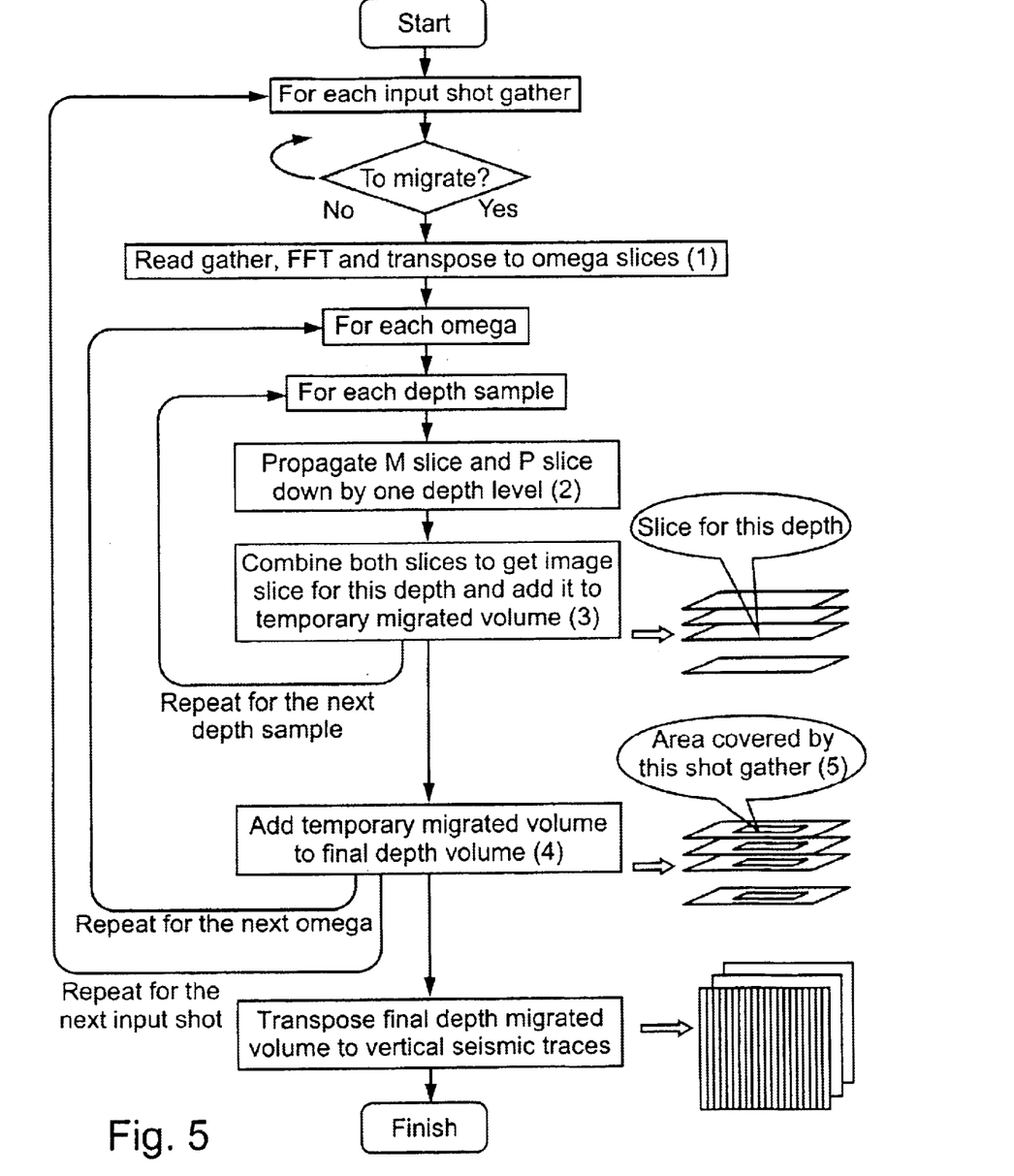
FIG. 5 is a simplified flow chart illustrating pre-stack seismic migration according to a preferred embodiment of the present invention.

In one preferred embodiment, the stacker 40 is located after the migrator, and the migrator carries out what is known as pre-stack migration. FIG. 5 is a simplified flow chart showing the procedure in pre-stack migration. The data gathered from the shot is transformed, preferably using the FFT, to the frequency domain data to form the P data. The procedure uses a modeling Omega slice M, from the M data, and P or data omega slice, hereinafter P data or P slice, formed from the P data, arranged for different depths for each omega. At each depth a downward propagation of the data is calculated for each M slice and each P slice and then the propagated slices are combined into an image slice for the given depth. The image slice is then added to a temporary data record referred to as the temporary migrated volume. The process is repeated over all the depths, and is then repeated for all frequencies for different values of omega. At the end of all of the depths for each value of omega the temporary migrated volume is added to a data record known as the final depth volume.

Once the procedure has been completed for each value of omega, the final depth volume can be transposed to provide vertical seismic traces. Vertical order is the standard sorting order of seismic data and allows viewing with standard visualization and interpretation software.

Figure 6:
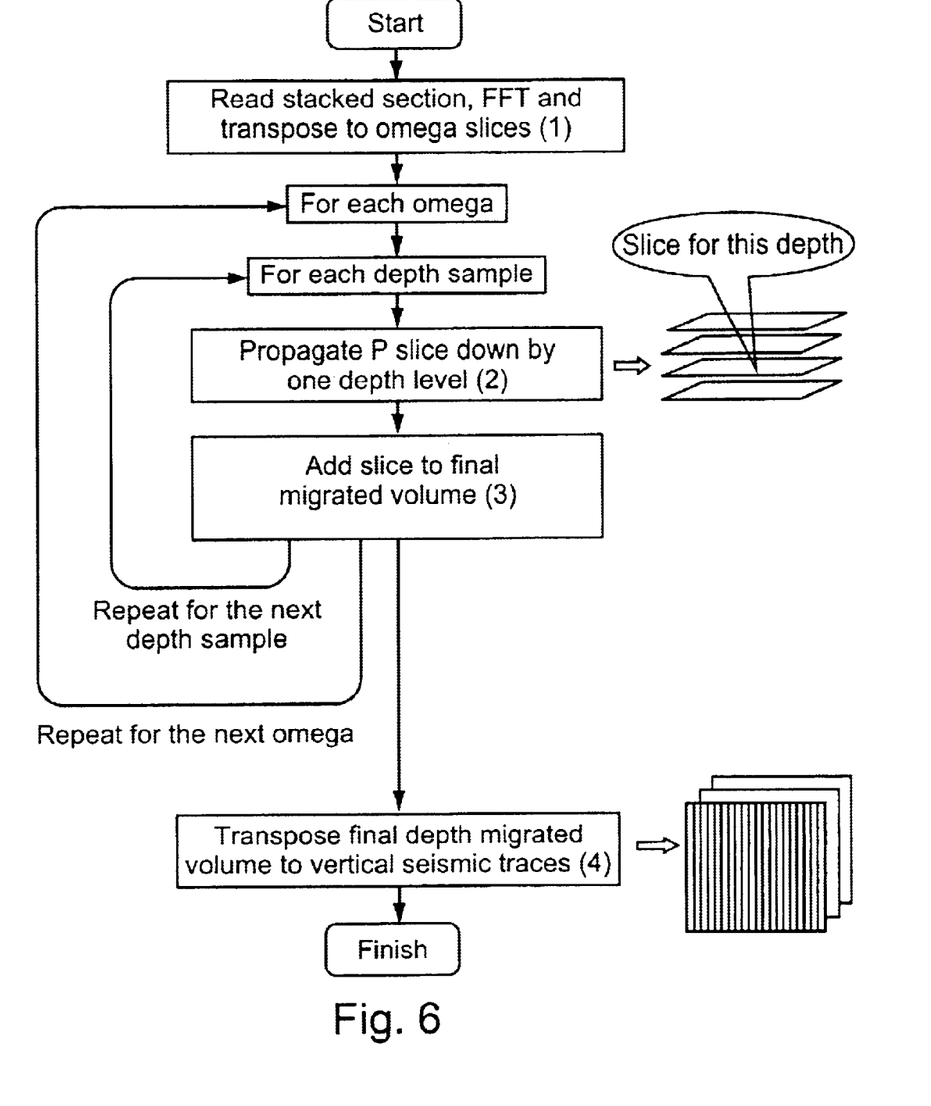
FIG. 6 is a simplified flow chart illustrating post-stack seismic migration according to a preferred embodiment of the present invention.

Returning now to FIG. 4, and stacking may also be carried out before migrating. In such a case the procedure of FIG. 6 is typically followed. The procedure of FIG. 6 begins by reading the output of the stacker 40, carrying out an FFT and then transposing the data onto P omega slices. Then for each depth, P slice data is propagated as before, and the result is added to the final depth volume. The procedure is repeated for each depth for each omega, and then once again the resulting final migrated volume is transposed to provide vertical seismic traces.

FIGS. 5 and 6 refer to common shot data gathering and zero offset data respectively. The skilled person will appreciate how to modify the procedure for common receiver data gathering, and common offset data gathering.

The depth migration is now considered in greater detail.

Depth Migration by Rational Krylov Expansion

Implementation of the above migration procedure for the acoustic wave equation uses a rational Krylov approximation as a numerical solution to equation (2.2). The procedure has the advantage of not being based on perturbations to the solutions of the wave equation, and there are no inherit dip limitations. As a result, the procedure appears to correct many of the deficiencies of migration methods, which are currently in use in the exploration industry for pre-stack depth imaging.

A derivation for the approach is now given. A starting point of the derivation is equation (2.2) given in the background. The equation may be spatially discretized on a uniform mesh in (x, y, z) followed by selection of a second derivative approximation to transform the equation into a system of coupled ordinary differential equations as follows:

$$\frac{d^2 p(z)}{dz^2} = -\frac{\omega^2}{c_0^2}\left(\frac{c_0^2}{c^2}I + \frac{c_0^2}{\omega^2}D\right)p(z). \tag{4.1}$$

I is the unit vector, $p(z)=\tilde{p}(x=i_x dx,\ y=i_y dy,\ z=i_z dz,\ \omega)$, where $0 \le i_x < N_x$, $0 \le i_y < N_y$, $0 \le i_z < N_z$. dx, dy, dz are the grid spacings in the x, y, and z directions respectively and $N_x$, $N_y$, $N_z$ are the number of sampling points in the three spatial coordinate directions.

$$D = \frac{\partial^2}{\partial x^2} + \frac{\partial^2}{\partial y^2},$$

and $c_0$ is a selected background velocity (usually the minimum velocity in each (x,y) slice).

We may then denote, $$\hat{D} = \frac{c_0^2}{c^2}I + \frac{c_0^2}{\omega^2}D = sI + \gamma D, \quad (4.2)$$

where,
$s(x,y,z)=c_0^2/c^2$, and $\gamma=c_0^2/\omega^2$. The upward propagating solution to (4.1) can formally be written as, $$p(z+dz) = e^{i\frac{f_0}{c_0}dz\sqrt{\hat{D}}} p(z). \quad (4.3)$$

Given $p(z)$ we may now create an orthogonal vector space of dimension $m=m_p+m_n$ from, $$V = \text{span }\{p, \hat{D}p, \ldots \hat{D}^{m_p-1}p, (\beta^1 I+\hat{D})^{-1}p, \ldots (\beta^1 I+\hat{D})^{-m_n}p\}.$$

Each vector in this space is of size $N=N_x \times N_y$.

Positive power vectors $\hat{D}^j p$, $j=0, \ldots, m_p-1$ may now be created by repeatedly applying the operator $\hat{D}$ to $p$. Negative power vectors on the other hand may be created by repeatedly applying the operator $(\beta^1 I+\hat{D})^{-1}$ to $p$. $\beta^1$ is a small imaginary constant which is chosen to stabilize the calculation of the inverse operator, by avoiding singularity and ill conditioning from small eigenvalues of the operator $\hat{D}$. In the following a single $\beta^1$ parameter is used, instead of the number of parameters as in (3.2) above. Although such an expansion may be less efficient, the accruing disadvantage appears to be outweighed by the increase in speed that can be achieved by using one parameter.

An orthogonal basis may now be created from the vectors that span V by a modified Gramn-Schmidt orthogonalization. We denote the unit vectors of this basis by $(v_i, i=0 \ldots m-1)$. Let V be the N by m matrix, whose columns consist of the $v_i$ vectors. We expand both $p(z)$ and $p(z+dz)$ according to, $$p(z) = \sum_{i=0}^{m-1} \alpha_z^i v_i,$$

or, $$p(z)=V\alpha_z \quad (4.4)$$

with $\alpha_z=(\alpha_z^0, \alpha_z^1, \ldots \alpha_z^{m-1})$.

Since $v_0=p(z)/\|p(z)\|_2$, in this case $\alpha_z^0=\|p(z)\|_2$ and $\alpha_z^j=0$ for $j>0$.

Similarly, the value of p at the next depth level is evaluated by, $$p(z+dz)=V\alpha_{z+dz} \quad (4.5)$$

A substitution of (4.4) and (4.5) into (4.3) yields, $$v\alpha_{z+dz} = e^{i\frac{H}{c_0}dz\sqrt{\hat{D}}} V\alpha_z.$$

Multiplying from the left by $V^H$, where the $^H$ superscript denotes the conjugate transpose, and using orthogonality $V^H V=I$, we obtain, $$\alpha_{z+dz} = V^H e^{i\frac{H}{c_0}dz\sqrt{\hat{D}}} V\alpha_z.$$

We now define $V^H \hat{D} V=H$, where H is a Hermitian m by m matrix (because the Laplacian operator D, and hence $\hat{D}$, is symmetric). Denoting the orthogonal matrix of eigenvectors of H by Q, we have $H=Q(\lambda)Q^T$, where $(\lambda)$ is the diagonal matrix containing the eigenvalues of H. Using the definition of a function of a matrix, $f(H)=Qf(\lambda)Q^T$, we finally obtain, $$\alpha_{z+dz} = Qe^{i\frac{H}{c_0}dz\sqrt{(\lambda)}} Q^T \alpha_z. \quad (4.6)$$

After calculation of the coefficients $\alpha_{z+dz}^j$, $j=0 \ldots m-1$, the value of $p(z+dz)$ is obtained from (4.4). A scheme based on the above derivations is applied repeatedly for the required number of depth steps.

Second Derivative Approximation

In the migration procedure as described above, a recursive second derivative operator with three coefficients is used. Recent work has shown that such operators are both accurate and fast, and reference is made in this connection to W. F. Spotz, and G. F. Carey, A High-Order Compact Formulation for the 3D Poisson Equation. Numer. Methods Partial Differential Equations, 12:235–243, 1996, and also to R. Soubaras. Explicit 3-D migration using equi-ripple polynomial expansion and Laplacian sysnthesis. Geophysics 61, 1386–1393. 1996. The contents of both of these documents are hereby incorporated by reference. The method, which was applied for generating of the filter coefficients, is based on an $L_\infty$ norm fit of the filter response. The approach is similar to that described in D. Hale, Stable explicit depth migration of seismic wavefields. Geophysics 56 1770–1777.1991, the contents of which are also hereby incorporated by reference. The approach is for designing explicit migration operators. It should present an improvement over the methods in the two preceding citations above which are based on a Pade approximation.

Given a discrete function $f=(f[0], f[1] \ldots f[N_x-1])$ sampled with a spatial sampling rate dx, the second derivative approximation is given by $D_x f$ where, $$D_x = \frac{1}{dx^2} \frac{a_0 I + a_1 \Delta_x}{I+b_1\Delta_x} = A\left(I + \frac{B}{I+b_1\Delta_x}\right). \quad (5.1)$$

$$A = \frac{a_1}{b_1 dx^2}, \text{ and } B = \frac{a_0 b_1}{a_1} - 1.$$

$a_0$, $a_1$, and $b_1$ are constants. In preferred embodiments, values of $Adx^2=8.926$, $B=-0.277$, and $b_1=0.139$ are typically used. The operator $\Delta_x$ is defined as, $$\Delta_x f[j]=f[j+1]+f[j-1].$$

The evaluation of equation (5.1) requires solving a set of linear equations. The matrix of the operator $I+b_1\Delta_x$ is tri-diagonal. Since the LU decomposition of this operator can be pre calculated, the evaluation of numerical second derivative can be done quite rapidly.

Calculation of $(\beta^i I+\hat{D})^{-1}v$ for the 2D Case

The calculation of $w=(\beta^i I+\hat{D})^{-1}v$ for a given vector v, can be done in the 2D (x, z) configuration with comparable numerical effort to the effort required to evaluate the second derivative operator $D_x f$.

Define, $$s^1=s+\gamma A,$$

and, $$\Lambda = \frac{1}{\gamma AB}(I + b_1 \Delta_x).$$

Using (4.2) and (5.1) we obtain, $$\hat{D} = sI + \gamma D_x = sI + \gamma A\left(I + \frac{B}{I + b_1 \Delta_x}\right) = s'I + \Lambda^{-1}.$$

We may define, $$T = \beta^1 I + \hat{D} = \tilde{s}I + \Lambda^{-1},$$

where, $\tilde{s} = \beta^1 + s^1$.

A calculation of $T^{-1}$ is as follows:

$$T = \tilde{s}^{1/2}(I + M^{-1})\tilde{s}^{1/2} \qquad (6.1)$$

where, $$M = \tilde{s}^{1/2}\Lambda\tilde{s}^{1/2} \qquad (6.2)$$

We obtain, $$T^{-1}\tilde{s}^{-1/2}(I + M^{-1})^{-1}\tilde{s}^{-1/2}.$$

The term in the middle can alternatively be evaluated, $$(I + M^{-1})^{-1} = (M + I)^{-1} M = (I - (M + I)^{-1}) \qquad (6.3)$$

Using (6.1), (6.2), and (6.3), the evaluation of $w = T^{-1}v$ can be carried out as follows;

$$w = \tilde{s}^{-\frac{1}{2}}(I - (M + I)^{-1})\tilde{s}^{-\frac{1}{2}}v = w_1 - w_2.$$

$w_1$ is given by, $$w_1 = \tilde{s}^{-1}v.$$

$w_2$ is given by, $$w_2 = \tilde{s}^{-\frac{1}{2}}(M + I)^{-1}\tilde{s}^{-\frac{1}{2}}v,$$

or, $$(M + I)\tilde{s}^{\frac{1}{2}}w_2 = \tilde{s}^{-\frac{1}{2}}v.$$

Using equation (6.2), this gives, $$(\Lambda + \tilde{s}^{-1}I)\tilde{s}w_2 = \tilde{s}^{-1}v.$$

This equation yields a tri-diagonal linear system for $\tilde{s}w_2$ with a right hand side vector $\tilde{s}^{-1}v$.

Calculation of $w = (\beta^i I + \hat{D})^{-1}v$ for the 3D Case

Unlike the 2D case, the operator $T^{-1} = (\beta^i I + \hat{D})^{-1}$, in the 3D case cannot be factored into a sum of a diagonal operator and a tri diagonal operator. Consequently we chose to calculate the operation $T^{-1}v$ iteratively by a block alternate direction method (ADI).

The operator $T = (\beta^1 + s)I + \gamma(D_x + D_y)$ is factored according to, $$T = A_1 + A_2 = A_1' + A_2',$$

where, $$\begin{cases} A_1 = \beta^I I + \gamma D_x, \\ A_2 = \beta^I I + \gamma D_y, \end{cases}$$

and, $$\begin{cases} A_1' = sI + \gamma D_x, \\ A_2' = sI + \gamma D_y. \end{cases}$$

Using an initial condition $w^0 = 0$, a single iteration of the solution scheme runs as follows, $$(A_1 + \alpha I)w^{n+1} = v - (A_2 - \alpha I)w^n \qquad (7.1a)$$

and, $$(A_2 + \alpha I)w^{n+2} = v - (A_1 - \alpha I)w^{n+1} \qquad (7.12b)$$

where the superscripts denotes the iteration number. The parameter a is an imaginary constant, the value of which is determined empirically for each frequency range with the objective to obtain optimal convergence. We have found that with typical frequencies and spatial discretization increments of exploration seismology, and a value of $\beta^1 = i$, the scheme converges in a few iterations. This value of $\beta^1$ is larger than the value for optimal convergence of the rational Krylov approximation. However, with smaller values of $\beta^1$, the scheme may require many iterations to converge, or may not converge at all. There is thus a need to compromise between the number of terms in the Krylov sum, and the rate of convergence of the ADI scheme.

A second alternative is to solve the system (7.1a,b) by the GMRES method and reference is made in this respect to G. Goulub and C. Van Loan: Matrix computations. Johns Hopkins University Press 1996 Y, and also to Saad and M. Schultz (1986): "GMRES: A Generalized Minimal Residual Algorithm for Solving Nonsymmetric Linear Systems," SIAM J. Scientific and Stat. Comp. 7, 856–859. The contents of both of these documents are hereby incorporated by reference.

After omitting the iteration superscript, equation (6.1a) can be substituted into (6.1b) to yield a preconditioned linear equation system for the solution vector of the form, A'w=v', where, $$A' = (I - (A_2 + \alpha I)^{-1}(A_1 - \alpha I)(A_1 + \alpha I)^{-1}(A_2 - \alpha I)) \qquad (7.2)$$

and, $$v' = (A_2 + \alpha I)^{-1}(I - (A_1 - \alpha I)(A_1 + \alpha I)^{-1})v \qquad (7.3)$$

The inverse power operations in (7.2) and (7.3) require solution of tri-diagonal equation systems. Solution of the linear equations by the GMRES method may yield a more efficient algorithm than the one which uses the ADI scheme.

Generation of the Orthogonal Basis Vectors

The first expansion vector is given by, $$V_0 = p(z)/\|p(z)\|_2.$$

For the generation of the vectors which span $K_p = \text{span}(v_0, \hat{D}v_0, \ldots \hat{D}^{mp-1}v_0)$, the present embodiments perform the following loop:

For $k = 1, \ldots, mp-1$:

a. Calculate $\hat{D}v_{k-1}$ by operating $\hat{D}$ on the previous vector.

b. Calculate the inner products $H_{jk-1} = (v_j, \hat{D}v_{k-1})$, $j = \ldots k-1$.

c. Perform a modified Gramn-Schmidt orthogonalization, $$v_k = \hat{D}v_{k-1} - \sum_{j=0}^{k-1} H_{jk} v_j.$$

d. Define $\gamma_k = (v_k, v_k)^{1/2}$, then normalize $v_k = v_k/\gamma_k$. Forming the inner product of $v_k$ with the previous equation and using orthogonality yields, $H_{kk-1} = \gamma_k$.

The remaining vectors ($V_{mp+j}$, j=0 ... $m_n$−1) are then generated according to the following steps, a. Calculate, $$\tilde{v}_{m_p+j} = \begin{cases} (\beta^I I + \hat{D})^{-1} v_0, & \text{for } j = 0 \\ (\beta^I + \hat{D})^{-1} v_{m_p+j-1}, & \text{for } 0 < j < m_n \end{cases}$$

b. Orthogonalize, $$v'_{m_p+j} = \tilde{v}_{m_p+j} - \sum_{k=0}^{m_p+j-1} (v_k, \tilde{v}_{m_p+j}) v_k = \tag{8.1}$$

$$= \tilde{v}_{m_p+j} - \sum_{k=0}^{m_p+j-1} L_{m_p+jk} v_k,$$

where, $$L_{m_p+jk} = (v_k, \tilde{v}_{m_p+j}) \; k=0 \ldots m_p+j-1$$

c. Normalize $$v_{m_p+j} = v'_{m_p+j}, \tag{8.2}$$

where $$\gamma_{m_p+j} = \|v'_{m_p+j}\|_2.$$

Using the above equation and (8.1) and (8.2), we get, $$\hat{D}v_{m_p+j} = \frac{1}{\gamma_{m_p+j}} \left[ \hat{D}\tilde{v}_{m_p+j} - \sum_{k=0}^{m_p+j-1} L_{m_p+jk} \hat{D}v_k \right] =$$

$$= \frac{1}{\gamma_{m_p+j}} \left[ (v_{m_p+j-1} - \beta^I v_{m_p+j}) - \sum_{k=0}^{m_p+j-1} L_{m_p+jk} \hat{D}v_k \right].$$

For $1 < m_p - 1$ $H_{m+j,l} = (v_{m_p+j}, Dv_l) = 0$, because $Dv_l$ belongs in the Krylov space $l=0 \ldots m_p-1$.

For $l=m_p-1$, $H_{m_p+j,m_p-1}$ is calculated directly.
For $l=m_p, \ldots m_p+j,$ $$H_{lm_p+j} = -\frac{1}{\gamma_{m_p+j}} \left[ -\delta_{m_p+j-1l} + \beta^I L_{m_p+jl} + \sum_{k=m_p-1}^{m_p+j-1} L_{m_p+jk} H_{lk} \right].$$

if $l=m_p+j$, we utilize the fact that $L_{m_p+jm_p+j} = \gamma_j$.

Downward Continuation Steps

The previous sections have presented the mathematical theory of the seismic migration method of the present embodiments. An element of the method is downward continuation of the surface values $p(x,y,z=0,\omega)$ in depth to form $p(x,y,z,\omega)$. As mentioned above, in common shot migration, which uses the imaging principle of cross-correlation of downward continued seismic data and forward modeled data from the source location, both the seismic data, and the modeled wave field need to be separately downward continued. Nevertheless, in post stack migration only the seismic data $p(x,y,z,\omega)$ is downward continued.

Returning now to FIG. 5, and referring to the reference numerals therein in parentheses, in (1) shot signal traces, denoted $p(x,y,z=0,t)$ are Fourier transformed by the FFT to form $\tilde{P}(x,y,z=0,\omega)$, the P data, and then are transposed into the respective order $x,y,\omega$ to form omega slices.

In (2), the data omega slice $\tilde{P}(x,y,z,\omega)$, and the modeling omega slice $\tilde{M}(x,y,z,\omega)$, referred to above as the P the M slices respectively, are propagated downward one depth level by the Krylov method to form $\tilde{P}(x,y,z+dz,\omega)$ and $\tilde{M}(x,y,z+dz,\omega)$ respectively.

In (3) the contribution of the P and M slices to the final migrated image from the current shot and omega is calculated (for example $P_{mig} = \tilde{P} \tilde{M}$).

In (4) the subsurface image from the current shot and omega is added to the final image of the whole survey.

As indicated at (5) the shot image, that is the image formed from an individual shot, usually occupies a smaller (x,y) area than the image for the full survey.

Returning now to FIG. 6 and in (I) the stacked traces of the seismic section $p(x,y,z=0,t)$ are Fourier transformed in time by the FFT to form $\tilde{P}(x,y,z=0,\omega)$, the P data, and then are transposed to the respective order $x,y,\omega$ as omega slices.

In (2) the slice $\tilde{P}(x,y,z,\omega)$ is propagated downward one depth level by the Krylov method to form $\tilde{P}(x,y,z+dz,\omega)$.

In (3), in accordance with any conditions pertaining to the formation of the image, the slice $\tilde{P}(x,y,z+dz,\omega)$ is added to the final migrated volume $P_{mig}(x,y,z+dz)$.

In (4) the final image $P_{mig}(x,y,z)$ is transposed from (x,y,z) slice order to (z,x,y) trace order.

FIGS. 5 and 6 present flow charts for common shot pre and post stack imaging respectively. Precise implementation details vary, but schemes based on the broad principles are representative of methods which are currently in use in the seismic industry. Other types of imaging have similar flow charts. For example common shot elastic migration based on the vector wave equation would have the same steps as in FIG. 5, except that downward continued data would include a multi component field instead of the single pressure field, and the Krylov expansion would use a different operator.

The existing systems use depth migration to correct the initial or false image, and many of the existing systems use wave equation propagation to carry out migration. The present embodiments are however unique in the use of the rational Krylov expansion method for propagating the solution from one depth level to the next, as explained in the derivation given above.

Figure 7:
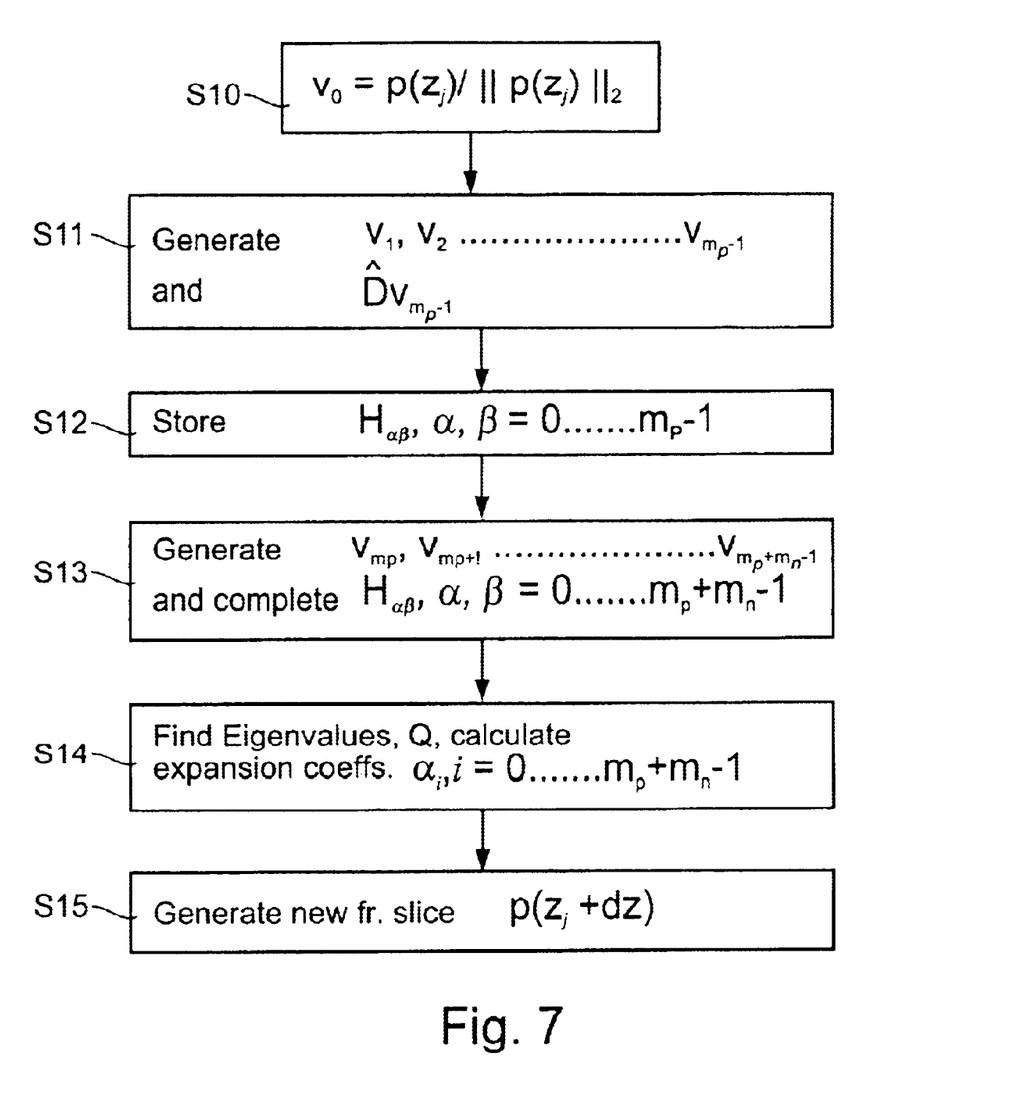
FIG. 7 is a simplified flow chart illustrating the steps in carrying out migration using a Krylov space expansion to approximate a wave equation according to a preferred embodiment of the present invention.

Reference is now made to FIG. 7, which is a simplified flow diagram illustrating a procedure, based on the above derivation, for using Krylov expansion in order to propagate a wave from one layer to the next:

In a first step S10, the procedure calculates $v_0 = p(z_j)/\|p(z_j)\|_2$, where vector $p(z_j)$ denotes omega slice $p(x,y,z=z_j,\omega)$.

In a second step, S11, the procedure generates $v_1, v_2 \ldots v_{m_p-1}$ and $\hat{D}V_{m_p-1}$ as described in the derivation section above under the heading "depth migration by rational Krylov expansion."

In a third step, S12, $H_{\alpha\beta}$, $\alpha$, $\beta=0 \ldots m_p-1$ are saved for future use.

In a fourth step S13, the system generates $v_{mp}, v_{mp+1} \ldots v_{m_p+m_n-1}$ as described in the above-mentioned part of the derivation section, and completes the calculation of $H_{\alpha\beta}$, $\alpha$, $\beta=0 \ldots m_p+m_n-1$.

In a step S14, eigenvalues ($\lambda$) and the orthonormal matrix Q are found as described in the above-mentioned section, and then expansion coefficients $\alpha_i, i=0, \ldots m_p+m_n-1$ are calculated according to equation (4.6) above.

Finally it is possible to generate the new frequency slice p($z_j$+dz) according to above equation (4.5).

According to the above-described embodiments there is provided a depth migration procedure based on a rational Krylov approximation of the formal solution to the wave equation. The procedure avoids exponential growth of evanescent wave components and has no dip limitation.

The above embodiments describe use of a Krylov-expansion based method for common shot imaging of surface recorded data. However, the same procedure can be applied to any type of imaging which uses the acoustic wave equation as its basis. Furthermore, the algorithm also applies to elastic imaging, in which case the point of departure is the vector wave equation.

The imaging method uses compact recursive derivative operators that were designed by an $L_\infty$ fit in the spectral domain of the operator response. Although such methods have been applied to convolutional explicit operators, the present inventor is not aware of any publication on such a design procedure for recursive derivative operators.

The methodology of the present embodiments can also be applied to calculation of wave propagation in the time domain for forward simulations. This approach should be especially important for wave propagation problems where the governing operator contains both positive and negative eigenvalues, or complex eigenvalues. An example of such a situation is wave propagation in a dissipative medium.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of imaging using wave propagation data, comprising
carrying out wave migration to model wave propagation layerwise, said migration comprising:
using a Krylov space expansion of an exponent of a square root operator to approximate a predetermined wave equation, and
using said approximation to model propagation of a wave between a first depth level and a second depth level of a geological structure, and
using said migration, together with said wave propagation data, to map positions of features through which said wave propagation has occurred.

2. The method of claim 1, comprising obtaining said Krylov space expansion using at least one shift parameter for providing solutions of said predetermined equations in depth.

3. The method of claim 1, wherein said migration is carried out on a plurality of signal traces and further comprising carrying out stacking between said traces.

4. The method of claim 3, wherein said stacking is carried out after said migration.

5. The method of claim 4, wherein said data comprises M data and P data and wherein said migration is carried out on a slice of said M data and a slice of said P data to provide M and P propagated data slices.

6. The method of claim 5, further comprising combining said M and P propagated data slices.

7. The method of claim 3, wherein said stacking is carried out before said migration.

8. The method of claim 7, wherein said data comprises P data and wherein said migration is carried out on a slice of said P data.

9. The method of claim 1, utilizing any one of a group of data gathering methods comprising common shot data gathering, common receiver data gathering, common offset data gathering, simultaneous shot geophone data gathering, zero offset imaging, and vertical seismic profiling.

10. The method of claim 1, wherein said predetermined wave equation is the acoustic wave equation.

11. The method of claim 1, wherein said imaging is seismic imaging and said features are features of sub-surface geological structure.

12. The method of claim 1, wherein said predetermined wave equation is the elastic vector wave equation.

13. The method of claim 1, wherein said predetermined wave equation is a visco-elastic wave equation.

14. The method of claim 1, wherein said approximating is carried out in time for at least one of forward migration and reverse time migration.

15. The method of claim 1 wherein said wave propagation comprises carrying out forward simulation of wave propagation in said geological structure, and wherein said migration comprises reverse time migration.

16. A method of seismic imaging comprising:
obtaining wave propagation data from a seismic source at a seismic receiver,
determining from said wave propagation data false locations of seismic features indicated in said data,
carrying out seismic migration over at least two depth levels to provide corrections to said false locations, wherein said seismic migration comprises using a Krylov space expansion of an exponent of a square root operator to approximate a wave equation and therefrom to model wave propagation between said at least two depth levels,
using said corrections with said false locations to form a seismic image indicating said features.

17. The method of claim 16, wherein said wave equation is any one of a group comprising the acoustic wave equation, the vector wave equation and an elastic wave equation.

18. The method of claim 16, comprising obtaining said Krylov space expansion over a depth using at least one shift parameter.

19. The method of claim 16, wherein said seismic migration is carried out on a plurality of signal traces and further comprising carrying out stacking between said traces.

20. The method of claim 19, wherein said stacking is carried out after said migration.

21. The method of claim 20, wherein said data comprises M data and P data and wherein said migration is carried out on a slice of said M data and a slice of said P data to provide M and P propagated data slices.

22. The method of claim 21, further comprising combining said M and P propagated data slices.

23. The method of claim 19, wherein said stacking is carried out before said migration.

24. The method of claim 23, wherein said data comprises P data and wherein said migration is carried out on a slice of said P data.

25. The method of claim 16, utilizing any one of a group of data gathering methods comprising common shot data gathering, common receiver data gathering, common offset data gathering, simultaneous shot geophone data gathering, zero offset imaging, and vertical seismic profiling.

26. The method of claim 16, wherein said seismic migration comprises wave equation migration.

27. Seismic imaging apparatus for receiving data propagated through sub-surface structure from a seismic source to at least one seismic receiver and forming an image therefrom, the apparatus comprising:
- an initial wave analyzer for forming an initial analysis from said data including determining initial locations of seismic features indicated in said data,
- a migrator, associated with said imager, for carrying out seismic migration over at least two depth levels to provide corrections to said initial locations, said migrator comprising a krylov space expander for carrying out a krylov space expansion of an exponent of a square root operator to approximate a predetermined wave equation, and therefrom to model a wave propagation between respective depth levels of said sub surface structure, and
- a corrector, for using said corrections with said initial locations to form a corrected mapping indicating said features, said mapping being usable for forming said seismic image.

28. The apparatus of claim 27, wherein said predetermined wave equation is any one of a group comprising the acoustic wave equation, the vector wave equation and an elastic wave equation.

29. The apparatus of claim 27, wherein said krylov space expander is configured to obtain said krylov space expansion over a depth using at least one shift parameter.

30. The apparatus of claim 27, wherein said migrator is configured to carry out said seismic migration on a plurality of signal traces and wherein said apparatus further comprises a stacker for carrying out stacking between said traces.

31. The apparatus of claim 30, wherein said stacker is located after said migrator.

32. The apparatus of claim 31, wherein said data comprises P data and wherein said migrator is configured to carry out said migration on a slice of said P data.

33. The apparatus of claim 30, wherein said stacker is located before said migrator.

34. The apparatus of claim 33, wherein said data comprises M data and P data and wherein said migrator is configured to carry out said migration on a slice of said M data and a slice of said P data to provide M and P propagated data slices.

35. The apparatus of claim 34, wherein said migrator further comprises a combiner for combining said M and P propagated data slices.

36. The apparatus of claim 27, configured to utilize at least one of a group of data gathering methods comprising common shot data gathering, common receiver data gathering, common offset data gathering, simultaneous shot geophone data gathering, zero offset imaging, and vertical seismic profiling.

37. The apparatus of claim 27, wherein said mapping is three-dimensional mapping suitable for preparation of a three-dimensional image.

38. The apparatus of claim 27, wherein said mapping is two-dimensional mapping suitable for preparation of a two-dimensional image.

* * * * *